United States Patent

Trammell et al.

[11] Patent Number: 5,874,794
[45] Date of Patent: Feb. 23, 1999

[54] METHOD FOR SECURING MAGNETS TO A PERMANENT MAGNET MOTOR SHELL AND A MOTOR MADE THEREFROM

[75] Inventors: Richard E. Trammell, Easley; John Mowery, Liberty, both of S.C.

[73] Assignee: Ryobi North America, Inc., Anderson, S.C.

[21] Appl. No.: 678,332

[22] Filed: Jul. 11, 1996

Related U.S. Application Data

[60] Provisional application No. 60/001,606 Jul. 28, 1995.

[51] Int. Cl.⁶ ............................ H02K 15/00; H02K 15/03; H02K 15/14
[52] U.S. Cl. ............................ 310/154; 310/42; 310/254; 310/218; 29/596
[58] Field of Search ................... 310/154, 42, 43, 310/254, 214, 218; 29/596

[56] References Cited

U.S. PATENT DOCUMENTS

| | | | |
|---|---|---|---|
| 2,569,278 | 9/1951 | Barth | 310/214 |
| 3,083,310 | 3/1963 | Tweedy | 310/154 |
| 4,071,794 | 1/1978 | Schoen | 310/154 |
| 4,445,060 | 4/1984 | Ruhle | 310/154 |
| 4,636,107 | 1/1987 | Casler | 403/405.1 |
| 4,745,319 | 5/1988 | Tomite et al. | 310/154 |
| 4,922,149 | 5/1990 | Isozumi et al. | 310/89 |
| 5,073,738 | 12/1991 | Tang | 310/91 |
| 5,216,306 | 6/1993 | Nakazawa et al. | 310/189 |
| 5,276,375 | 1/1994 | Hartel | 310/154 |
| 5,391,063 | 2/1995 | Hantle et al. | 417/423.7 |
| 5,475,275 | 12/1995 | Dohogne et al. | 310/89 |

Primary Examiner—Nestor Ramirez
Assistant Examiner—K. E. Tamai
Attorney, Agent, or Firm—Brooks & Kushman P.C.

[57] ABSTRACT

A pair of semicylindrical magnet segments are secured against the inner surface of a motor shell of a permanent magnet motor by wedging an elastic locking element into each space between the magnets. Each locking element has an enlarged head portion that extends beyond opposite ends of the magnet segments, the lock elements maintaining the magnet segments in position, circumferentially, radially and axially, within the motor shell to form a shell-magnet subassembly. An assembly fixture is used to support and align the elements during their assembly. A motor armature, including a commutator, is inserted within the subassembly, and end caps having bearings and brushes are bolted to respective ends of the motor shell to form a complete motor.

15 Claims, 6 Drawing Sheets

METHOD FOR SECURING MAGNETS TO A PERMANENT MAGNET MOTOR SHELL AND A MOTOR MADE THEREFROM

CROSS-REFERENCE TO RELATED APPLICATION

This is a continuation of Provisional Application No. 60/001606, filed Jul. 28, 1995.

TECHNICAL FIELD

This invention relates to a method for securing magnets to a permanent magnet motor shell to form a motor subassembly and to a motor including the subassembly.

BACKGROUND ART

Some previously designed permanent magnet motors had permanent magnets affixed to the inner surfaces of associated motor shells with adhesive substances. The use of adhesives to secure magnets in place can present problems, however. Due to their application and/or curing times and the general mess sometimes attending their storage, handling and application, the use of adhesives can slow the overall process of motor assembly.

Depending on the adhesives used, especially under high ambient temperature and high-vibration conditions, the bonds secured therewith can be less than permanent. If toxic or flammable adhesives are used, there can also be safety problems involving personnel working with, or in the area of, the adhesives. Environmental and disposal problems are also a problematic consideration when such materials are used.

A number of methods have been developed to mount permanent magnets within motor shells without resorting to adhesives. For example, U.S. Pat. No. 5,216,306, to Nakazawa et al., teaches the use of magnet holders that resiliently apply force against one edge of a magnet, forcing the opposite edge against a fixed magnet-supporting piece and the magnet against the inner peripheral surface of an inner cylinder. The magnet holders are held in position, after assembly, by the reaction forces resulting from the resilient forces they exert on the magnets.

U.S. Pat. No. 5,276,375, to Hartel, and No. 5,391,063, to Hantle, are both generally similar to the Nakazawa patent in that they also teach the use of components, in their cases U-shaped springs, that resiliently apply force against one edge of a magnet, forcing the opposite edge against an unyielding magnet-supporting piece.

DISCLOSURE OF INVENTION

An object of the present invention is to provide a method for securing magnets to a permanent magnet motor shell to form a shell-magnet subassembly without using an adhesive or means mechanically attached to the motor shell.

A feature of the present invention is that several of the elements of the subassembly, during its assembly, urge other elements of the combination into appropriate locations and maintain them in position, circumferentially, radially and axially, thereafter.

An advantage of the present invention is that the method is suitable for high-speed, automated, motor assembly.

Another advantage of the present invention is that the shell-magnet subassembly is capable of withstanding high ambient temperatures without having the effectiveness of an adhesively secured bond compromised.

In realizing the aforementioned and other objects, features and advantages, the method of the present invention includes positioning a motor shell, having first and second ends and inner and outer surfaces, on an assembly fixture. The assembly fixture includes a stepped locator projection having an upper region and a lower region. The diameter of the lower region is greater than that of the upper region. The lower region has an axial alignment recess therein and an alignment projection extending radially therefrom. The lower region has been configured to slidably fit within the cylindrical motor shell and to locate the axial position of magnet segments.

The motor shell has an alignment notch in the second end thereof and is positioned on the lower region of the locator projection such that the alignment projection on the lower region of the locator projection is received within the alignment notch in the motor shell. A first lock element is inserted between the upper region of the locator projection and the motor shell. The first lock element is elongate, semicylindrical and elastic and has a tapered insertion end, a central region, and a head portion that is wider than its central region. The first lock element has an axial bolt passage longitudinally disposed therethrough. The first lock element is positioned such that its head portion resides in the alignment recess of the lower region of the locator projection.

One of a pair of semicylindrical magnet segments is positioned adjacent each side of the first lock element. The magnet segments are positioned and supported axially by the lower region of the locator projection and are positioned radially between the upper region of the locator projection and the motor shell.

A second lock element, which is preferably physically identical to the first lock element, is then positioned with its tapered insertion end introduced between the magnet segments. The second lock element is then forced between the magnet segments until the head portion abuts the pair of magnet segments. At this point, the first lock element will be diametrically opposite to, and axially reversed with respect to, the first lock element. The magnet segments will also be diametrically opposite each other within the cylindrical motor shell, each magnet segment subtending an obtuse central angle. The first and second lock elements exert sufficient lateral separation forces to maintain the magnetic segments against the inner surface of the motor shell to form stator poles.

The method described by the foregoing is used to assemble a shell-magnet subassembly for use in a permanent magnet motor. Such a motor is completed by inserting a motor armature into the subassembly. First and second end caps are respectively positioned on the first and second ends of the motor shell. A bearing is centrally mounted on the first end cap, as is a brush assembly to support a pair of electrical brushes. A bearing is also centrally mounted on the second end cap. The motor armature has an axial output shaft that extends through at least the second end cap and is rotatably supported by the respective bearings mounted on the first and second end caps. The motor armature also includes a commutator rotatable therewith, and the brushes are resiliently biased thereagainst. The end caps are secured to the motor shell by a pair of longitudinal bolts each of which passes through the axial bolt passage in a respective lock element.

The objects, features and advantages of the present invention are readily apparent from the following detailed description of the best mode for carrying out the invention when taken in connection with the accompanying drawings.

BRIEF DESCRIPTION OF THE DRAWINGS

A more complete appreciation of the invention and many of the attendant advantages thereof may be readily obtained by reference to the following detailed description when considered with the accompanying drawings in which like reference characters indicate corresponding parts in all the views, wherein.

BEST MODE FOR CARRYING OUT THE INVENTION

Figure 1:
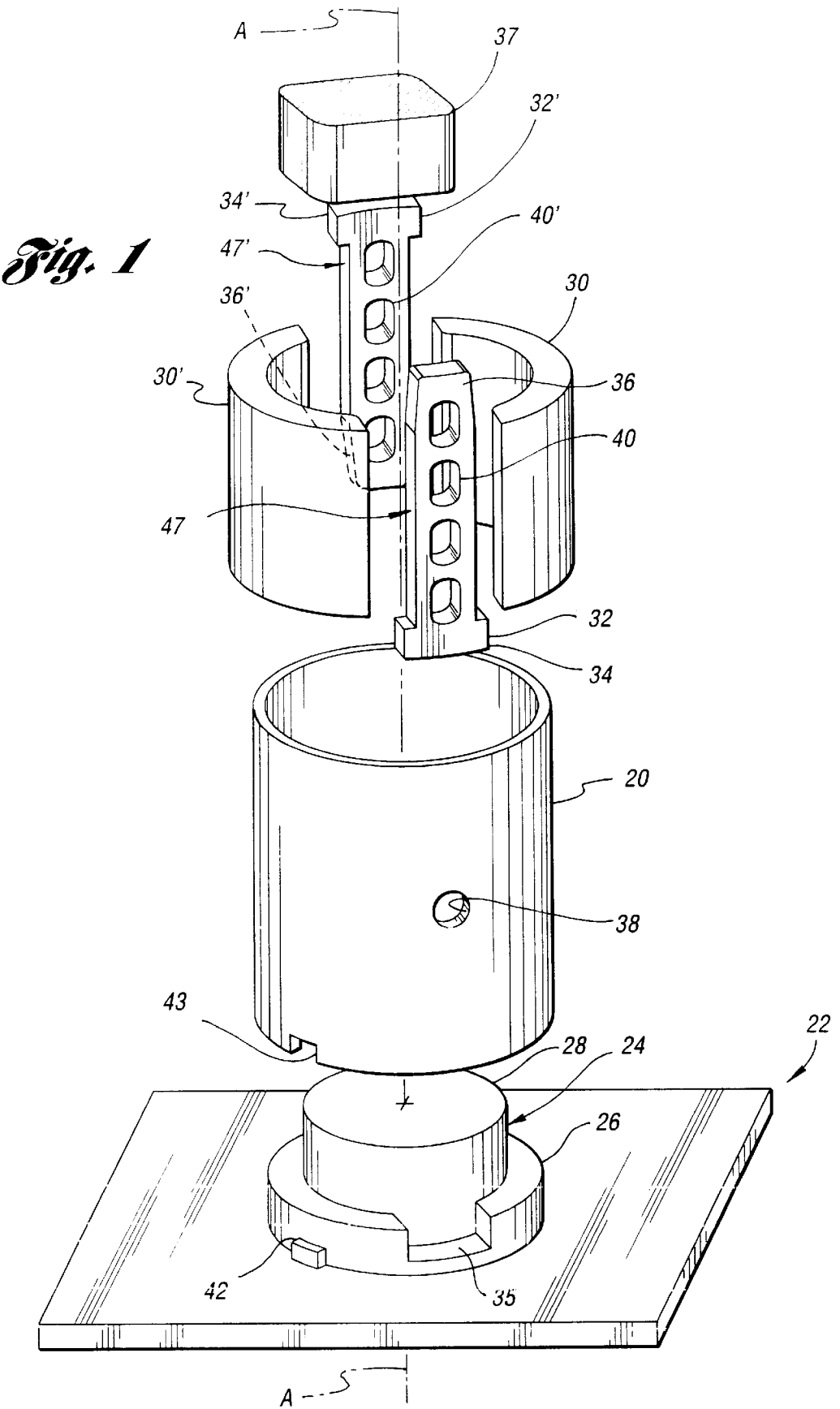
FIG. 1 is an exploded, perspective view of the apparatus of the present invention.

The present invention relates to a method of affixing semicylindrical magnet segments to a permanent magnet motor shell without the use of adhesives. Referring to FIG. 1, a conventional cylindrical motor shell 20, having first and second ends, inner and outer surfaces and a central axis A, is positioned on an assembly fixture, generally indicated by reference numeral 22. The assembly fixture 22 is provided with a stepped locator projection, generally indicated by reference numeral 24, having a large diameter lower region 26 and a small diameter upper region 28. The lower region 26 is sized to fit within the motor shell 20 and has an axial dimension selected to position the magnet segments 30 and 30' at a desired axial location within the motor shell 20.

The motor shell 20 has an alignment notch 43 in the second end thereof. The lower region 26 of the assembly fixture 22 has an alignment projection 42 extending radially therefrom and also has an alignment recess 35 axially disposed therein. The angular relationship between the alignment projection 42 and the alignment recess 35 is fixed.

First and second lock elements, 32 and 32' respectively, are provided to secure the magnet segments 30 and 30' to the motor shell 20. The lock elements 32 and 32' are preferably identical in shape, are preferably formed of a moldable plastic material such as ABS or the like, and are preferably provided with a plurality of radial apertures 40 and 40', which enhance their elasticity. The lock elements 32 and 32' are generally T-shaped, having enlarged head portions 34 and 34', central regions, generally indicated by reference numerals 47 and 47', and tapered insertion ends 36 and 36', as shown in detail in FIG's. 4 through 9. The radial thickness of the periphery of each lock element, when viewed axially, is essentially uniform.

With the motor shell 20 installed on the assembly fixture locator projection 24, the pair of magnet segments 30 and 30' and the first lock element 32 are inserted into the motor shell 20. The lower region 26 of the locator projection 24 serves to position the magnet segments 30 and 30' axially, and the upper region 28 serves to maintain the magnet segments in proximity to the inner surface of the motor shell 20. It should be noted that the first lock element 32, which is inserted initially with the magnet segments 30 and 30', has its head portion 34 positioned in the alignment recess 35 of the assembly fixture 22. This establishes a reference with respect to which the magnet segments 30 and 30' are ultimately positioned.

Figure 4:
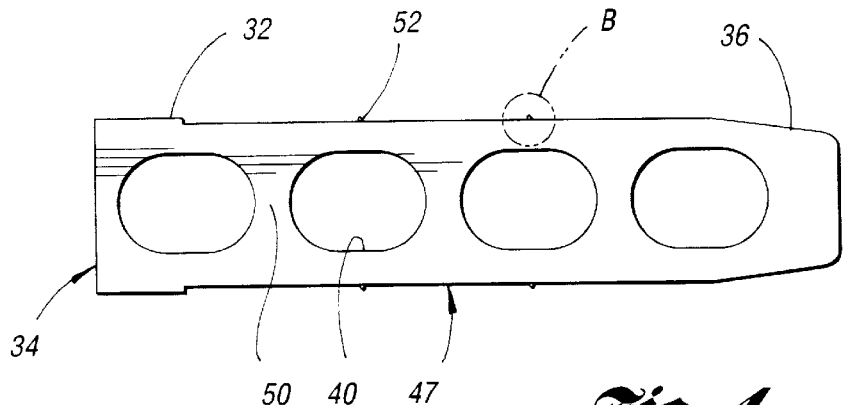
FIG. 4 is side view of a lock element of the present invention.
Figure 5:
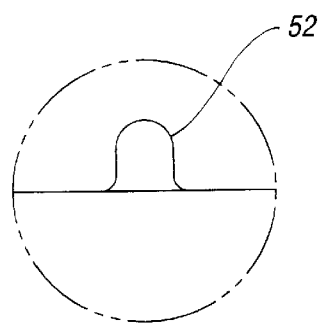
FIG. 5 is a magnified view of a crush rib in the circled area B of the lock element of FIG. 4.
Figure 6:
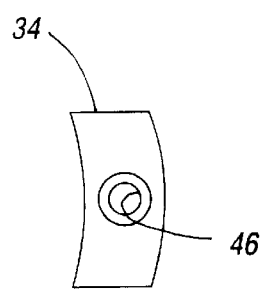
FIG. 6 is an end view of the lock element of FIG. 4.
Figure 7:
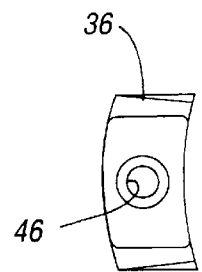
FIG. 7 is a view of the lock element of FIG. 4 shown from the opposite end as in FIG. 6.
Figure 8:
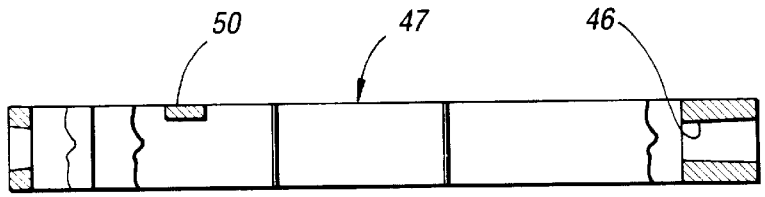
FIG. 8 is an edge view of the lock element of FIG. 4, partially broken away to reveal sectioned areas.
Figure 9:
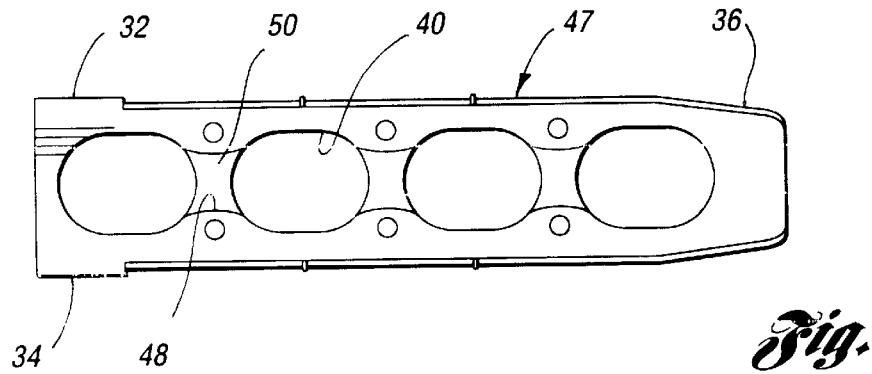
FIG. 9 is a view of the lock element of FIG. 4 shown from the opposite side.
Figure 10:
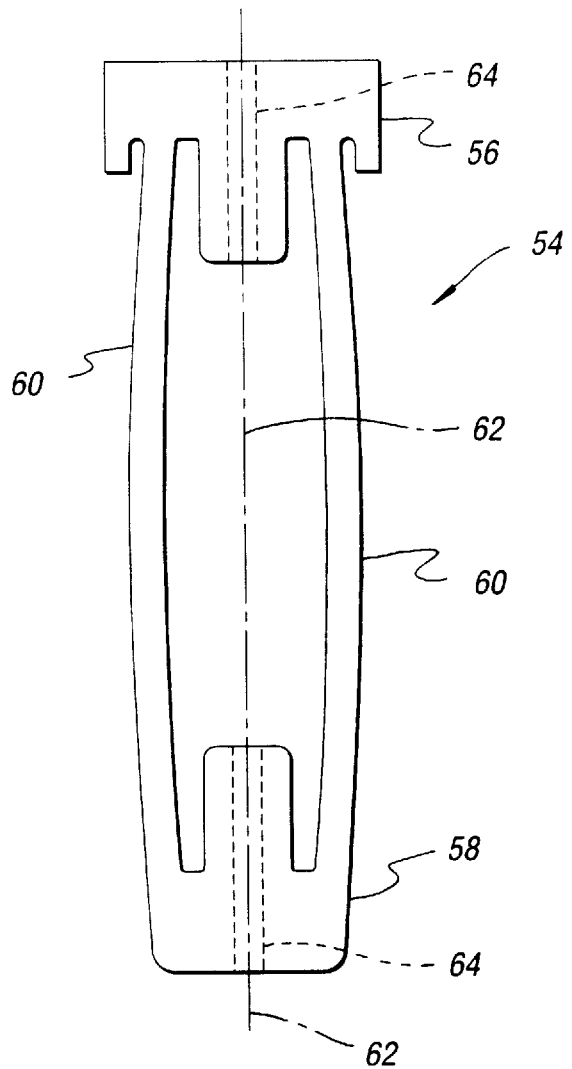
FIG. 10 is a side view of a lock element associated with a second embodiment of the invention.
Figure 11:
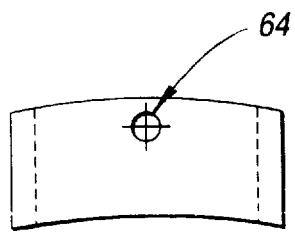
FIG. 11 is a view from the enlarged head portion end of the lock element of FIG. 10.

The second lock element 32' is then inserted, insertion end 36' first, between the magnet segments 30 and 30' and at a location that is diametrically opposite the first lock element 32. The lock elements 32 and 32' have a width that is sized relative to the magnet segments 30 and 30' and to the motor shell 20 to cause an interference fit between the lock element and the magnet segments. The interference fit necessitates the use of a ram 37 or the like to press the lock element 32' into place. The lock elements 32 and 32' have sufficient elasticity to maintain the magnet segments 30 and 30' in place, during normal operating conditions, without the use of adhesives. The insertion end and the central portion of each lock element, as shown in FIGS. 4, 8 and 9, is free of latching projections that would prevent relative axial movement between the lock elements and magnet segments in contact therewith.

Figure 2:
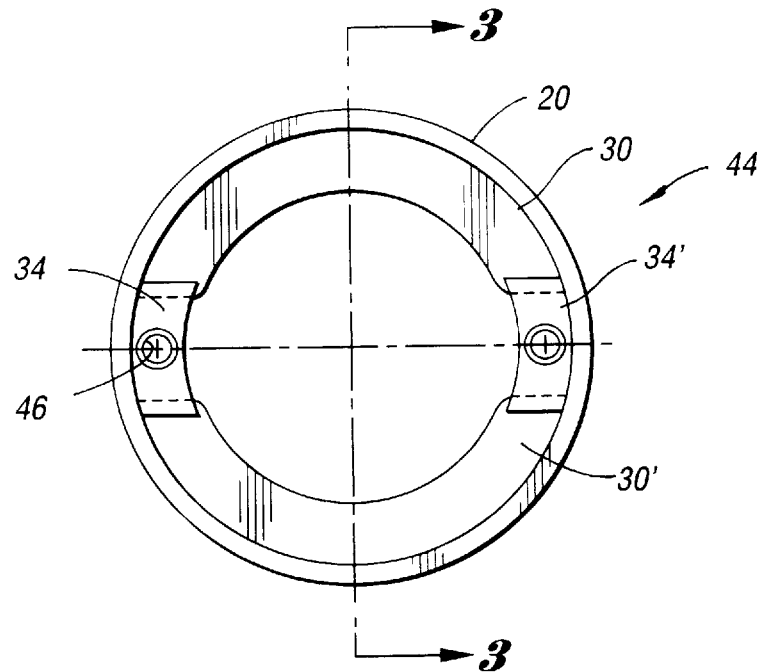
FIG. 2 is an end view of the subassembly of the present invention.
Figure 3:
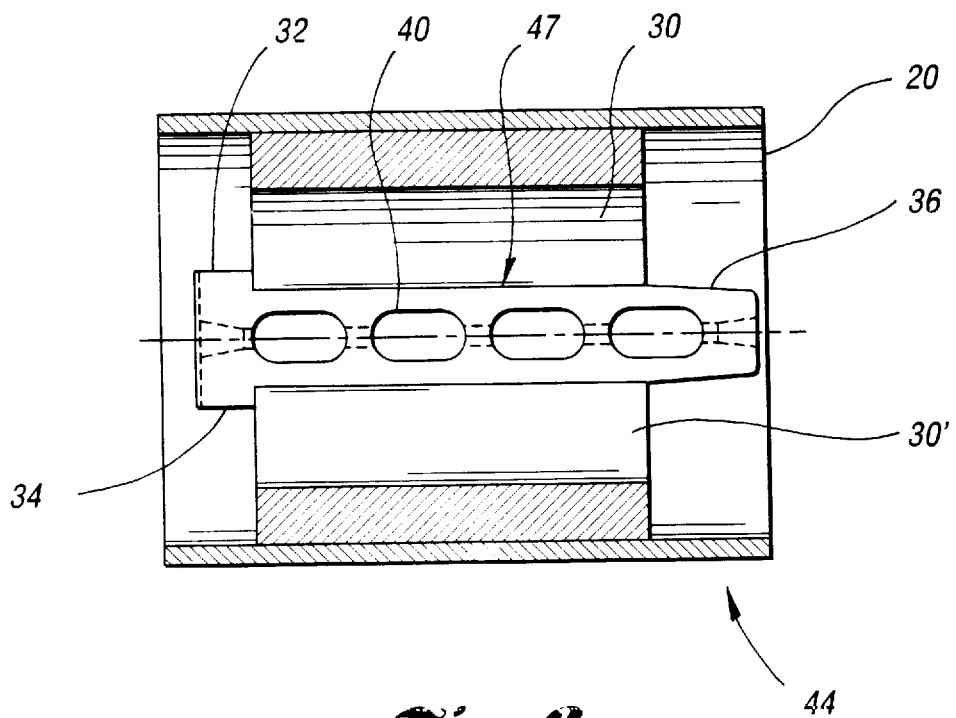
FIG. 3 is a sectional side view of the subassembly of FIG. 2.

The completed shell-magnet subassembly 44 is then removed from the assembly fixture 22. An axial end view and a cross-sectional side elevation of the shell-magnet subassembly 44 are respectively shown in FIG's. 2 and 3. As best seen in FIG. 2, each of the lock elements 32 and 32' are provided with an axial bore 46 for receiving a longitudinal bolt (not shown). In FIG. 3, the orientation of the lock element head portion 34 relative to the magnet segments 30 and 30' is illustrated.

FIG's. 4 through 9 illustrate five views of the lock element 32. As can be seen in FIG. 4, the head portion 34 need not be very much wider than the central region 47 of the lock element 32. Similarly, the insertion end 36 is tapered only slightly relative to the central region 47. As illustrated in FIG's. 4 and 5, the latter showing an enlarged portion of the former, the central region 47 of a lock element is provided with a plurality of crush ribs 52 formed on the surfaces that cooperate with the magnet segments 30 and 30'. The crush ribs 52 help ensure that the magnet segments 30 and 30' are securely forced against the inner surface of the motor shell 20 throughout the full possible range of component tolerance summations. The crush ribs 52 maintain forcible contact with magnet segments 30 and 30' when there is a large motor shell-small magnet condition. The crush ribs 52 on the second lock element 32' simply shear off during the pressing step when there is a small motor shell-large magnet condition that results in a tight fit of the lock element.

FIG's. 6 and 7 are respective end views of the head portion 34 and the tapered insertion end 36 of the lock element 32. FIG. 8 is an edge view of the lock element 32, shown partially broken away to reveal sectioned areas. In addition to the four apertures 40 illustrated in FIG. 4, an axial groove 48 is shown in FIG's. 8 and 9 formed in the lock element central region 47 to further increase the elasticity of the lock element 32 when compressed between adjacent magnet segments 30 and 30'. In FIG. 8, the groove 48 is shown to have a depth of at least seventy-five, and preferably eighty, percent of the thickness of the center portion of the central region 47, leaving three thin webs 50 defined between adjacent apertures 40. The thickness of the webs is thus less than one quarter, and preferably one fifth, that of the total thickness of the lock element. As previously mentioned, the radial thickness of the periphery of each lock element, when viewed axially, is essentially uniform. As also shown in FIG. 8, the bore 46 extends through the lock element head portion 34 and the insertion end 36 to provide clearance for a longitudinal bolt. The bore wall preferably diverges as it approaches each end of lock element 32 to facilitate the insertion of such a bolt.

Figure 12:
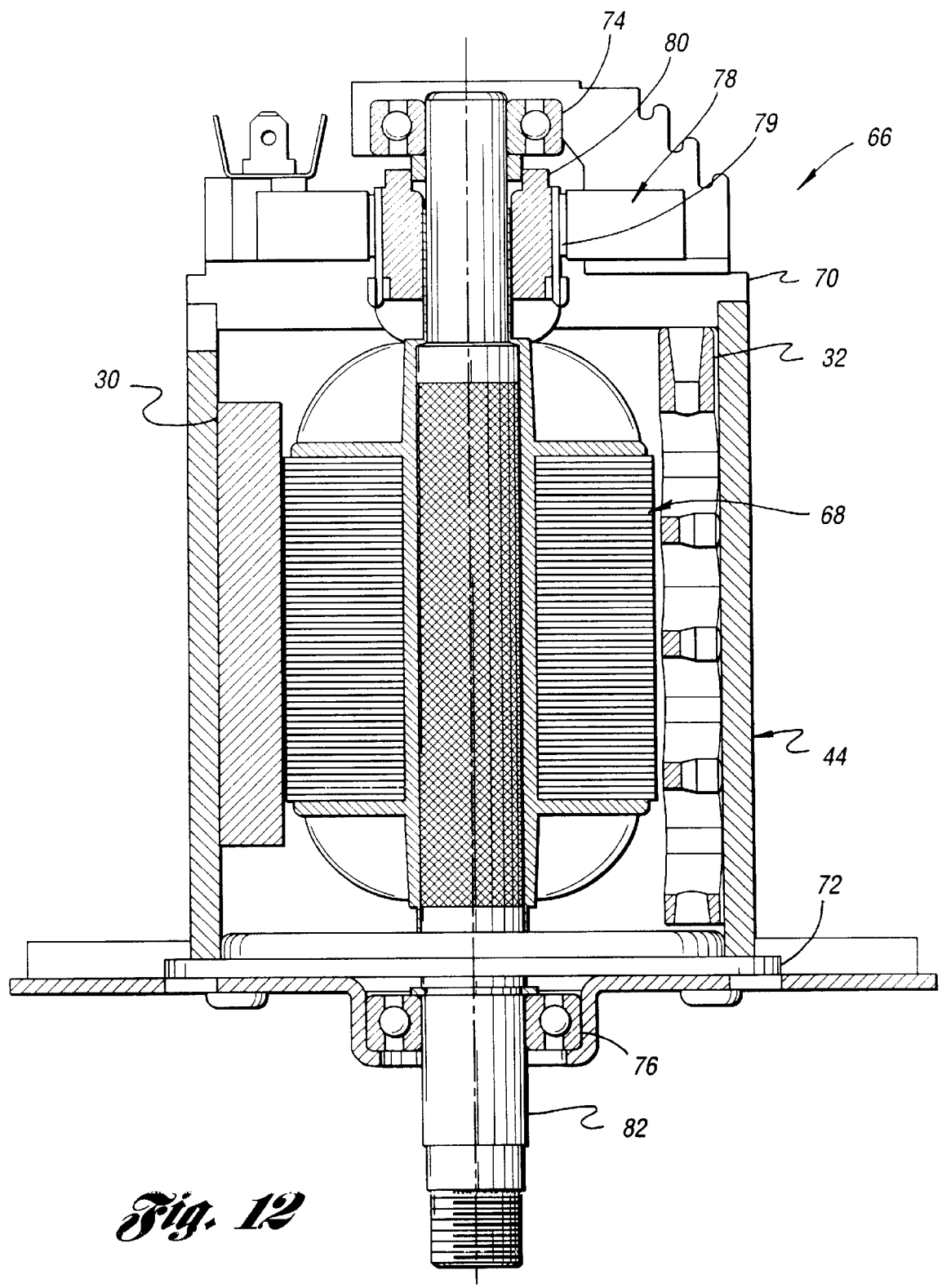
FIG. 12 is a sectional side view of an assembled motor of the present invention.

If desired, an access hole 38 is provided in the motor shell 20 of motor assemblies to temporarily lock a motor armature, generally indicated by reference numeral 68 in FIG. 12, relative to the motor shell 20. As shown in FIG. 1, the fixed angular relationship between the alignment projection 42 and the alignment recess 35 ensures that the access hole 38 and an aperture 40 in the lock element 32 are always in alignment. This permits the insertion of a tool to engage and immobilize the motor armature 68.

FIG's. 10 and 11 respectively illustrate side and end views of an alternative lock element, generally indicated by reference numeral 54. The lock element 54 is provided with a head portion 56, a tapered insertion end 58 and a pair of flexible central members 60, which are bowed outward relative to a center line 62. The head portion 56 and the insertion end 58 are provided with an axial access hole 64 for receiving an elongated bolt (not shown).

FIG. 12 illustrates a cross-sectional side elevation view of a complete electric motor assembly, generally indicated by reference numeral 66, of the present invention. The motor 66 includes a shell-magnet subassembly 44 having magnet segments 30 (shown) and 30' and a pair of lock elements 32 (shown) and 32'. Motor armature 68 is axially oriented within the shell-magnet subassembly 44 and pivotally supported at its two respective ends by a first end cap 70 and a second end cap 72, each respective end cap being provided with bearings 74 and 76 as illustrated.

The first end cap 70 is also provided with a brush assembly 78 for supporting electrical brushes 79, which are resiliently biased against a motor armature commutator 80. The motor armature 68 is provided with an armature output shaft 82 extending from ate least one end of the motor assembly 66. A pair of longitudinal bolts (not shown) extend through lock elements 32 (shown) and 32' to clamp the end caps 70 and 72 together, enclosing the shell-magnet assembly therebetween to form a complete permanent magnet DC motor assembly.

Figure 13:
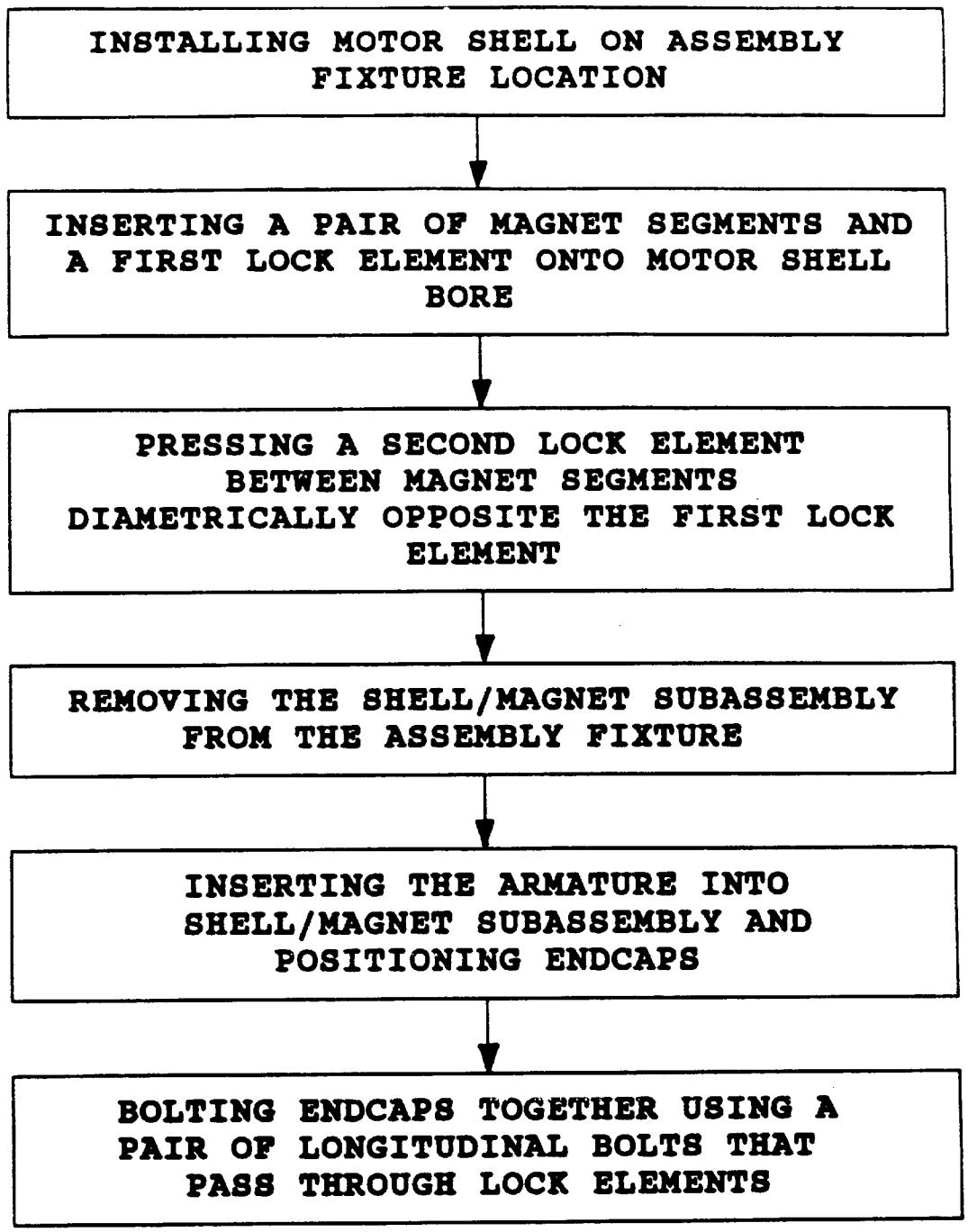
FIG. 13 is a flow chart of the steps in the method of the present invention.

FIG. 13 summarizes the method of combining a motor shell 20 and magnet segments 30 and 30' to form a subassembly 44 of a permanent magnet DC motor and further includes a method of using the shell-magnet subassembly 44 to assemble a complete DC motor 66. As previously described, the first step in the assembly process is installing the motor shell 20 on an assembly fixture 22. The next step is the inserting of a pair of magnet segments 30 and 30' and a first lock element 32 into the motor shell 20 and locating the magnet segments 30 and 30' relative to the motor shell 20. A second lock element 32' is then pressed between the magnet segments 30 and 30' diametrically opposite the first lock element 32, outwardly biasing the magnet segments 30 and 30' and securing the magnet segments to the motor shell 20 without the use of adhesives. The shell-magnet subassembly 44 is then removed from the assembly fixture 22, a motor armature 68 is inserted into the shell-magnet subassembly 44, and end caps 70 and 72 are respectively positioned on opposite ends of the motor shell 20. The end caps 70 and 72 are then bolted together using a pair of longitudinal bolts (not shown), which pass through the lock elements 32 and 32', forming a completed permanent magnet DC motor 66.

Although the present method can be applied manually, it is envisioned that a semiautomated or a completely automated parts handling system will be utilized during the constructing of the shell-magnet subassembly 44 and during the subsequent installation of the motor armature 68 and end caps 70 and 72.

While the best mode for carrying out the invention has been described in detail, those familiar with the art to which this invention relates will recognize various alternative designs and embodiments for practicing the invention as defined by the following claims.

What is claimed is:

1. A shell-magnet subassembly for use in a permanent magnet motor, the subassembly comprising:

a cylindrical motor shell having a central axis and inner and outer surfaces;

a pair of semicylindrical magnet segments disposed in diametric opposition against the inner surface of the motor shell to form stator poles, each magnet segment subtending an obtuse central angle; and a pair of elongate, plastic lock elements, each disposed with an interference fit between the magnet segments, each exerting sufficient lateral separation forces to maintain the magnet segments against the inner surface of the motor shell, and each having an insertion end, a central region and a head portion that is wider than the central region, the lock elements being disposed in opposite axial directions such that, when the lock elements are positioned between the magnet segments, the head portions extend therebeyond so that the lock elements axially as well as circumferentially and radially secure the magnet segments in place, wherein the radial thickness of the periphery of each lock element, when viewed axially, is essentially uniform.

2. The subassembly as defined by claim 1, wherein the insertion end of at least one of the pair of lock elements is tapered to facilitate its insertion between two magnet segments.

3. The subassembly as defined by claim 1, wherein the lock elements are semicylindrically configured to conform to the curvature of the inner surface of the motor shell.

4. The subassembly as defined by claim 1, wherein each lock element is provided with a plurality of laterally extending crush ribs to compensate for component size variations and ensure contact with the magnet segments.

5. The subassembly as defined by claim 1, wherein each lock element is provided with a plurality of radial apertures to enhance the elasticity thereof.

6. The subassembly as defined by claim 5, wherein each lock element is provided with an axial groove extending along its central region to further enhance the elasticity thereof, the axial groove leaving, between adjacent radial apertures, webs having a thickness less than one quarter that of the total thickness of the lock element.

7. The subassembly as defined by claim 2, wherein the tapered insertion end and the head portion of each lock element have therein an axial bore forming with the axial groove an axial bolt passage to receive a longitudinal bolt.

8. A permanent magnet motor comprising:

a cylindrical motor shell having a central axis and first and second ends and inner and outer surfaces;

a pair of semicylindrical magnet segments disposed in diametric opposition against the inner surface of the motor shell to form stator poles, each magnet segment subtending an obtuse central angle;

a pair of elongate, plastic lock elements, each disposed with an interference fit between the magnet segments, each exerting sufficient lateral separation forces to maintain the magnet segments against the inner surface of the motor shell, and each having an insertion end, a central region and a head portion that is wider than the central region, the lock elements being disposed in opposite axial directions such that, when the lock elements are positioned between the magnet segments, the head portions extend therebeyond so that the lock elements axially as well as circumferentially and radially secure the magnet segments in place, wherein the radial thickness of the periphery of each lock element, when viewed axially, is essentially uniform, the insertion end and the central portion of each lock element being free of latching projections that would prevent bidirectional relative axial movement between the lock elements and the pair of magnet segments in contact therewith;

a first end cap mountable on the first end of the motor shell, the first end cap having a bearing centrally mounted thereon;

a brush assembly mounted on the first end cap and supporting a pair of electric brushes;

a second end cap mountable on the second end of the motor shell and having a bearing centrally mounted thereon;

a motor armature having an axial output shaft extending through at least the second end cap and being rotatably supported by the bearings mounted on the first and second end caps, the motor armature also having a commutator rotatable therewith and disposed between the pair of brushes, the brushes being resiliently biased against the commutator; and a pair of longitudinal bolts, each extending through a respective axially aligned bolt passage formed in each of the lock elements to secure each end cap to a respective end of the motor shell.

9. The permanent magnet motor as defined by claim 8, wherein the insertion end of at least one of the pair of lock elements is tapered to facilitate its insertion between two magnet segments.

10. The permanent magnet motor as defined by claim 8, wherein the lock elements are semicylindrically configured to conform to the curvature of the inner surface of the motor shell.

11. The permanent magnet motor as defined by claim 8, wherein each lock element is provided with a plurality of laterally extending crush ribs to compensate for component size variations and ensure contact with the magnet segments.

12. The permanent magnet motor as defined by claim 8, wherein each lock element is provided with a plurality of radial apertures to enhance the elasticity thereof.

13. The permanent magnet motor as defined by claim 12, wherein each lock element is provided with an axial groove extending along its central region to further enhance the elasticity thereof, the axial groove leaving between adjacent radial apertures webs having a thickness less than one quarter that of the total thickness of the lock element.

14. The permanent magnet motor as defined by claim 9, wherein the tapered insertion end and the head portion of each lock element have therein an axial bore forming with the axial groove an axial bolt passage to receive a longitudinal bolt.

15. A method for constructing a shell-magnet subassembly for use within a cylindrical motor shell of a permanent magnet motor, the motor shell having a central axis and an alignment notch in one end thereof, the method comprising:

providing a pair of semicylindrical magnet segments for disposition in diametric opposition against the inner surface of the motor shell to form stator poles, each magnet segment subtending an obtuse central angle;

providing first and second elongate, semicylindrical, plastic lock elements, each lock element having a tapered insertion end, a central region, and a head portion that is wider than its central region, and each lock element having therein an axial bolt passage, wherein the radial thickness of the periphery of each lock element, when viewed axially, is essentially uniform;

providing an assembly fixture including a stepped locator projection having an upper region and a lower region, the diameter of the lower region being greater than that of the upper region, the lower region having an alignment projection extending axially therefrom and an axial alignment recess therein to receive the entire head portion of the first lock element, the lower region having been configured to slidably fit within the cylindrical motor shell and to locate the axial position of the magnet segments;

positioning the motor shell on the assembly fixture such that the alignment projection on the lower region of the locator projection is received within the alignment notch in the motor shell;

positioning the first lock element between the upper region of the locator projection and the motor shell by inserting the entire head portion of the first lock element into the alignment recess;

positioning, between the upper region of the locator projection and the motor shell, one of the pair of magnet segments adjacent each side of the first lock element, the magnet segments being axially supported in position by the lower region of the locator projection; and introducing the tapered insertion end of the second lock element between the magnet segments, diametrically opposite to and axially reversed with respect to the first lock element, and forcing the second lock element between the magnet segments until the head portion abuts the pair of magnet segments, which prevents further insertion of the second lock element.

* * * * *